(12) United States Patent
Liu et al.

(10) Patent No.: US 10,049,413 B2
(45) Date of Patent: Aug. 14, 2018

(54) AUTOMATICALLY CREATING A HIERARCHICAL STORYLINE FROM MOBILE DEVICE DATA

(71) Applicant: Vulcan Technologies LLC, Seattle, WA (US)

(72) Inventors: Alan Linchuan Liu, Seattle, WA (US); Kevin Francis Eustice, Seattle, WA (US); Michael Perkowitz, Seattle, WA (US)

(73) Assignee: VULCAN TECHNOLOGIES LLC, Seattle, WA (US)

( * ) Notice: Subject to any disclaimer, the term of this patent is extended or adjusted under 35 U.S.C. 154(b) by 74 days.

(21) Appl. No.: 14/491,095

(22) Filed: Sep. 19, 2014

(65) Prior Publication Data

US 2015/0088492 A1 Mar. 26, 2015

Related U.S. Application Data

(60) Provisional application No. 61/880,632, filed on Sep. 20, 2013.

(51) Int. Cl.
*G06F 17/27* (2006.01)
*G06Q 50/00* (2012.01)
*G06F 17/30* (2006.01)

(52) U.S. Cl.
CPC ......... *G06Q 50/01* (2013.01); *G06F 17/3087* (2013.01)

(58) Field of Classification Search
CPC ...... G06F 17/27; G06F 17/20; G06F 17/2705; G06F 17/271; G06F 17/2715; G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/277; G06F 17/2775
USPC .................................................. 704/1, 9, 10
See application file for complete search history.

(56) References Cited

U.S. PATENT DOCUMENTS

| | | | |
|---|---|---|---|
| 6,768,994 B1 * | 7/2004 | Howard | G06F 17/3087 |
| 7,421,155 B2 | 9/2008 | King et al. | |
| 9,122,757 B1 * | 9/2015 | Wernick | G06F 17/30424 |
| 2005/0182773 A1 * | 8/2005 | Feinsmith | G06Q 10/10 |
| 2005/0289469 A1 * | 12/2005 | Chandler | H04N 7/163 |
| | | | 715/745 |

(Continued)

*Primary Examiner* — Lamont Spooner
(74) *Attorney, Agent, or Firm* — Davis Wright Tremaine LLP

(57) ABSTRACT

Embodiments create and label contextual slices from observation data and aggregate slices into a hierarchical storyline for a user. A context is a (possibly partial) specification of what a user was doing in the dimensions of time, place, and activity. A storyline is composed of a time-ordered sequence of contexts that partition a given span of time that are arranged in groups at one or more hierarchical levels. A storyline is created through a process of data collection, slicing, labeling, and aggregating. Raw context data can be collected from a variety of observation sources with various error characteristics. Slicing refines the raw context data into a consistent storyline composed of a sequence of contexts representing homogeneous time intervals. Labeling adds more specific and semantically meaningful data (e.g., geography, venue, activity) to the slices. Aggregation identifies groups of slices that correspond to a single semantic concept.

23 Claims, 8 Drawing Sheets

(56) References Cited

U.S. PATENT DOCUMENTS

| | | | |
|---|---|---|---|
| 2006/0029296 A1 | 2/2006 | King et al. | |
| 2006/0041828 A1 | 2/2006 | King et al. | |
| 2006/0050996 A1 | 3/2006 | King et al. | |
| 2006/0053097 A1 | 3/2006 | King et al. | |
| 2006/0217990 A1 | 9/2006 | Theimer et al. | |
| 2007/0006098 A1 | 1/2007 | Krumm et al. | |
| 2008/0194268 A1* | 8/2008 | Koch | H04L 67/22 455/456.1 |
| 2009/0164439 A1* | 6/2009 | Nevins | G06F 17/30551 |
| 2009/0171901 A1* | 7/2009 | Bathiche | G06F 17/30525 |
| 2010/0049583 A1* | 2/2010 | Panje | G06Q 30/02 705/7.42 |
| 2010/0223195 A1* | 9/2010 | Cherneff | G06Q 10/08 705/333 |
| 2011/0106719 A1* | 5/2011 | Wang | G06Q 50/01 705/319 |
| 2011/0270517 A1* | 11/2011 | Benedetti | G01C 21/20 701/533 |
| 2011/0270836 A1* | 11/2011 | Yang | G06Q 10/10 707/737 |
| 2011/0276396 A1* | 11/2011 | Rathod | G06F 17/30867 705/14.49 |
| 2012/0054246 A1* | 3/2012 | Fischer | G06Q 10/06 707/793 |
| 2012/0233000 A1* | 9/2012 | Fisher | G06Q 30/02 705/14.71 |
| 2012/0254764 A1* | 10/2012 | Ayloo | G06Q 30/02 715/738 |
| 2012/0309412 A1* | 12/2012 | MacGougan | G06F 3/0346 455/456.1 |
| 2013/0073539 A1* | 3/2013 | Bowser | G06F 17/30867 707/722 |
| 2013/0096731 A1* | 4/2013 | Tamari | G06F 11/3013 701/1 |
| 2013/0166575 A1* | 6/2013 | Lee | G06F 17/30994 707/752 |
| 2013/0246433 A1* | 9/2013 | Fuller | G06F 17/30424 707/740 |
| 2013/0346423 A1* | 12/2013 | MacGougan | G01C 21/30 707/748 |
| 2014/0007010 A1* | 1/2014 | Blom | G06F 3/011 715/825 |
| 2014/0032208 A1* | 1/2014 | Liu | H04W 4/21 704/9 |
| 2014/0032358 A1 | 1/2014 | Perkowitz et al. | |
| 2014/0032453 A1 | 1/2014 | Eustice et al. | |
| 2014/0032572 A1 | 1/2014 | Eustice et al. | |
| 2014/0047316 A1* | 2/2014 | Strydom | G06F 3/0481 715/233 |
| 2014/0122483 A1* | 5/2014 | Zhang | G06Q 10/10 707/737 |
| 2014/0129942 A1* | 5/2014 | Rathod | H04N 21/44222 715/720 |
| 2015/0356121 A1* | 12/2015 | Schmelzer | G06F 17/30289 707/803 |

* cited by examiner

AUTOMATICALLY CREATING A HIERARCHICAL STORYLINE FROM MOBILE DEVICE DATA

CROSS-REFERENCE TO RELATED APPLICATION

This application claims the benefit of U.S. Provisional Application No. 61/880,632, filed Sep. 20, 2014, which is hereby incorporated by reference in its entirety.

BACKGROUND

1. Technical Field

The described embodiments pertain to interpreting location data and other data about a person collected from mobile devices and networked services.

2. Description of Related Art

Many mobile devices can record location and other information. Having a temporal record of where the user goes is useful for a variety of applications, including recommendation systems, life logging, and goal tracking. However, there are a number of obstacles to building useful applications on top of currently available data streams.

First, data streams are noisy, imprecise, and sometimes unavailable. Global Positioning System (GPS) technology, for example, can be confused by surrounding buildings or other features and is not available indoors. Cell tower triangulation is imprecise and is unavailable in areas without proximate cell towers. WiFi triangulation is error-prone and also unavailable in the absence of nearby WiFi networks.

Second, sensor readings (e.g., from satellite signals or other radio waves) consume significant power at the sensing device. Due to limited battery power in the sensing device, sensor readings are done sparingly. Fewer readings increase the uncertainty in data due to significant gaps between sensor readings.

Third, people generally think about their lives as a collection of time periods with some semantic meaning attached to each period, with a range of levels of abstraction. Raw location data in the form of latitude/longitude readings has no semantic content, and thus does not indicate how users perceive corresponding events.

SUMMARY

Embodiments of the invention include a method, a non-transitory computer readable storage medium and a system for creating contextual slices and grouping them to create a hierarchical structure that represents the user's contextual history at multiple levels of granularity. A context is a (possibly partial) specification of what a user was doing in the dimensions of time, place, and activity. Each of these dimensions may be defined specifically (e.g., location defined by latitude 47.60621, longitude −122.332071) or very generally (e.g., the location "Seattle, Wash."), or entirely unspecified (e.g., omitted or a default value). They may also be ascribed varying degrees of semantic meaning (e.g., "Seattle" contains more semantic information than "47.60621, −122.332071"). A context represents a stay at a certain location or travel from one location to another. Contexts may have probabilities associated with them. In some cases, contexts may be inferred from evidence rather than known with certainty. Thus, contexts can vary in their specificity, their semantic content, and their likelihood.

Data collection is performed by context collectors collecting raw context data. Raw context data can be obtained from a variety of observation sources, sensors, monitors, third party sources, and the like. A process referred to herein as slicing refines an unorganized, multi-threaded collection of raw contexts produced by data collection into a consistent storyline composed of a sequence of slices, each slice corresponding to a time range and associated with one or more additional contexts.

A context refiner identifies slices with related contexts and aggregates such slices into groups (or chapters) that correspond to a single semantic concept (e.g., vacation in Hawaii, at work, bar-hopping). The chapters collectively form the user's storyline. In some embodiments, the context refiner includes additional levels in the hierarchy of the user's storyline. For example, chapters representing a semantic concept at one level of abstraction may be grouped into books, with each book corresponding to a semantic concept at a higher level of abstraction (e.g., a collection of slices in bars could be combined into a chapter labeled as "bar-hopping" that is in turn part of a book labeled "Boston Trip," which also includes attendance at a work-conference, visits to museums, and the like). In some embodiments, these semantically meaningful chapters are applied as evidence in determining a user's preferences, habits, and/or personality traits.

In one embodiment, the slicing process is generally divided into three phases: preprocessing, segmentation, and reconciliation. Preprocessing involves filtering, smoothing, and interpolating data to reduce the effects of noise and uneven sampling rates during data collection. Segmentation involves determining distinct, contiguous series of contexts from the groomed sensor data representing different activities. Reconciliation resolves newly generated contextual slices with previously generated contextual slices.

Labeling is the process of adding more specific and semantically meaningful data to the slices. Labeling may add geography (such as the context's city or neighborhood), venue (public places, businesses, or personally significant places like "home"), and/or activity (such as "working", "eating", or "going to see a movie"). In one embodiment, the labeling process is generally divided into three phases: label candidate search, label candidate ranking, and label application. In label candidate search, label sources are queried to discover possible labels based on the slice context. In label candidate ranking, the likelihood of each label candidate is evaluated based on the slice context and ranked according to likelihood. In label application, labels deemed sufficiently likely can be applied to label the slices.

Aggregation is the process by which the slices are analyzed to identify chapters therein. In various embodiments, groups of slices that correspond to a single event or other semantic concept are identified using combinations of automatic and/or manual techniques. Group labels (e.g., short textual descriptions) describing the corresponding events (or other semantic concepts) are added to the groups. In one embodiment, the metadata includes contextual labels that are assigned to components of an event. These contextual labels describe the type of grouping using some ontology such that similar types may be retrieved/compared. For example, "Sightseeing in Boston" and "Sightseeing in Seattle" could both be tourism-related, while "Jogging at Central Park" and "Rollerblading around Green Lake" could be considered exercise-related. This ontology may describe common types of activities pursued (e.g., travel, work, sightseeing) or around typical traits or personal tendencies (exercise, love of the outdoors, dining out). Depending on how the data is to be analyzed and presented, a given ontology will be of greater or lesser value. For example, the sightseeing groupings are likely to be of value when building a timeline of important life events to present to a user, while the exercise related groupings would be more pertinent when determining the user's routine and/or personality traits.

Embodiments of the computer-readable storage medium store computer-executable instructions for performing the steps described above. Embodiments of the system further comprise a processor for executing the computer-executable instructions.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Embodiments of the invention enable the creation and labeling of contextual slices from observation data and the aggregation of such slices into a hierarchical storyline of a user's movements. A context is a specification of what a user is doing in the dimensions of time, place, and activity. Contexts may only partially specify what a user is doing, omitting one or more a user's time, place, or activity. Contexts can vary in their specificity, their semantic content, and their likelihood. A storyline is composed of a time-ordered sequence of contexts that partition a given span of time that are arranged into groups at a plurality of hierarchical levels. In one embodiment, groups of one or slices are aggregated into a plurality of chapters, which collectively make up the user's storyline.

A storyline is created through a process of data collection, slicing, labeling, and aggregation. Raw context data can be collected from a variety of observation sources with various error characteristics. Slicing refines an unorganized collection of contexts produced by data collection into a consistent storyline composed of a sequence of contexts representing homogeneous time intervals. Labeling adds more specific and semantically meaningful data (e.g., geography, venue, activity) to the storyline produced by slicing. Aggregation identifies groups of slices that all correspond to a single semantic concept, such as a commute, a vacation, health and fitness activities, a period of employment, and the like. A given slice may be included in more than one group. For example, a hike in Yosemite National Park may be identified as part of a vacation, but also be included in a group corresponding to health and fitness activities. Accordingly, the storyline data is then available to offer a historical perspective to the user or for further processing in other applications.

System Overview

Figure 1A:
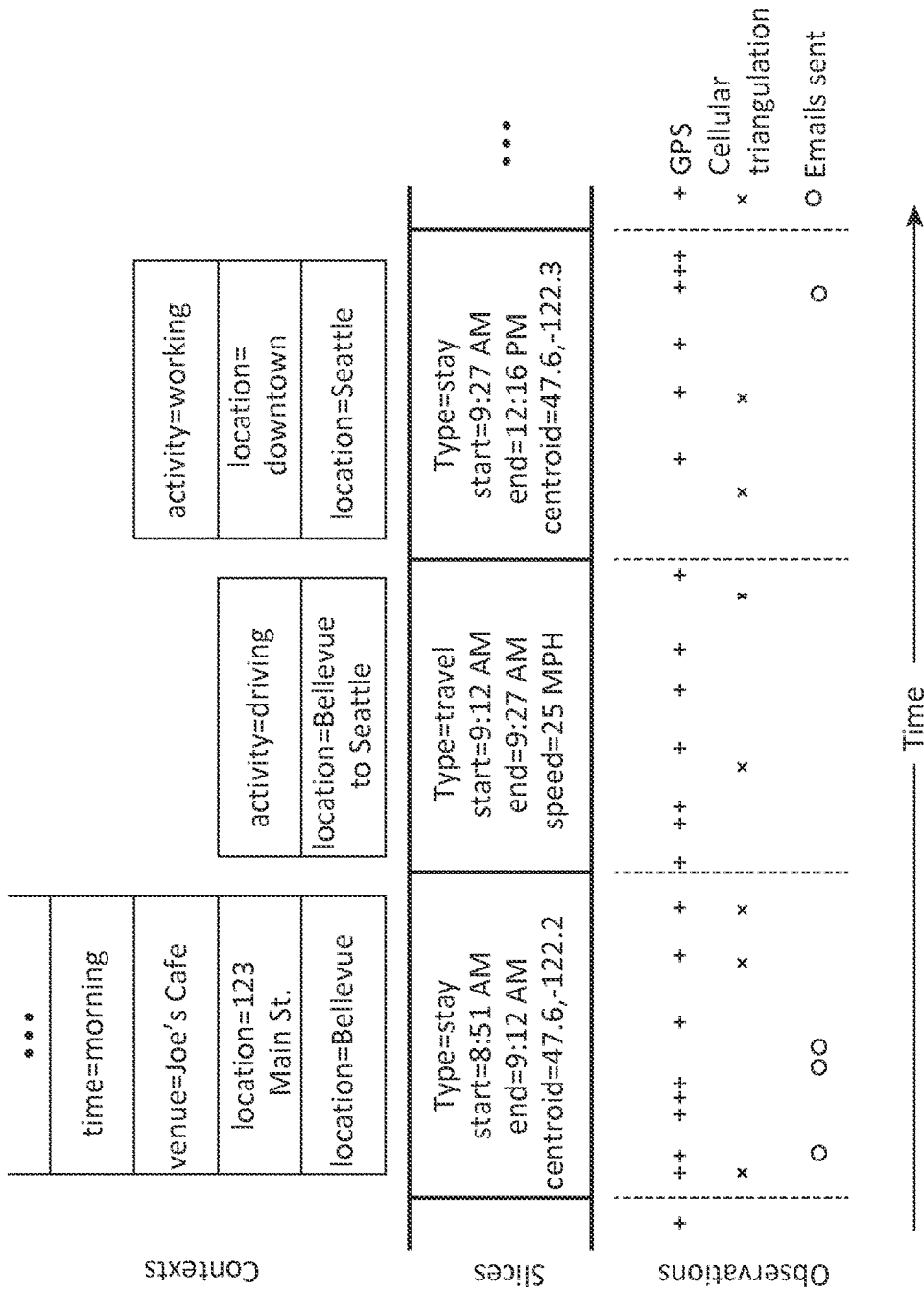
FIG. 1A is a diagram illustrating the relationship of sensor data, slices, and contexts, in accordance with an embodiment.

FIG. 1A is a diagram illustrating the relationship of sensor data, slices, and contexts, in accordance with an embodiment. FIG. 1A illustrates observations, which are the collections of sensor data from a mobile device. In this example, the observations include Global Positioning System readings, cellular triangulation signals, and emails sent from the device. The points along the time axis at which these observations are collected are marked. As a result of these observations, the user's time can be divided into a sequence of slices. In this example, each slice has a type and a start and end time. In this example, the type is either "stay" or "travel" and the start and end times establish the limits or boundaries of the slice. For "stay" type slices, the slice also has a centroid location, and for "travel" type slices, the slice also has a speed of the travel. In this example, based on the division of observations into time slices, a variety of metadata representing contexts have been attached to the slices. The metadata may describe the dimensions of time, place, and activity of the user at various levels of generality. For example, the first slice is associated with a place dimension of the context at various levels of generality/specificity: at a city level, a street address level, and a venue level.

One use of storyline data is to offer a historical perspective to the user, who may peruse the storyline to view his/her previous activities. Another use of storyline data is for further processing into interesting aggregations, e.g., identifying a collection of activities that collectively represent a vacation, identifying a group of slices that represent the user's day at work, identifying a pair of travel slices and a stay slice as a trip to the gym, and the like, in accordance with various embodiments of the invention. Yet another use of storyline data is to inform a summary of the user's personality, e.g., a user having a certain number of chapters identified as "going hiking" may indicate a trait such as "love of the outdoors" and/or a goal such as "fitness fanatic." This information can be useful for increasing self-awareness or goal tracking purposes, e.g., seeing how much time was spent exercising or eating out at restaurants per month.

Figure 1B:
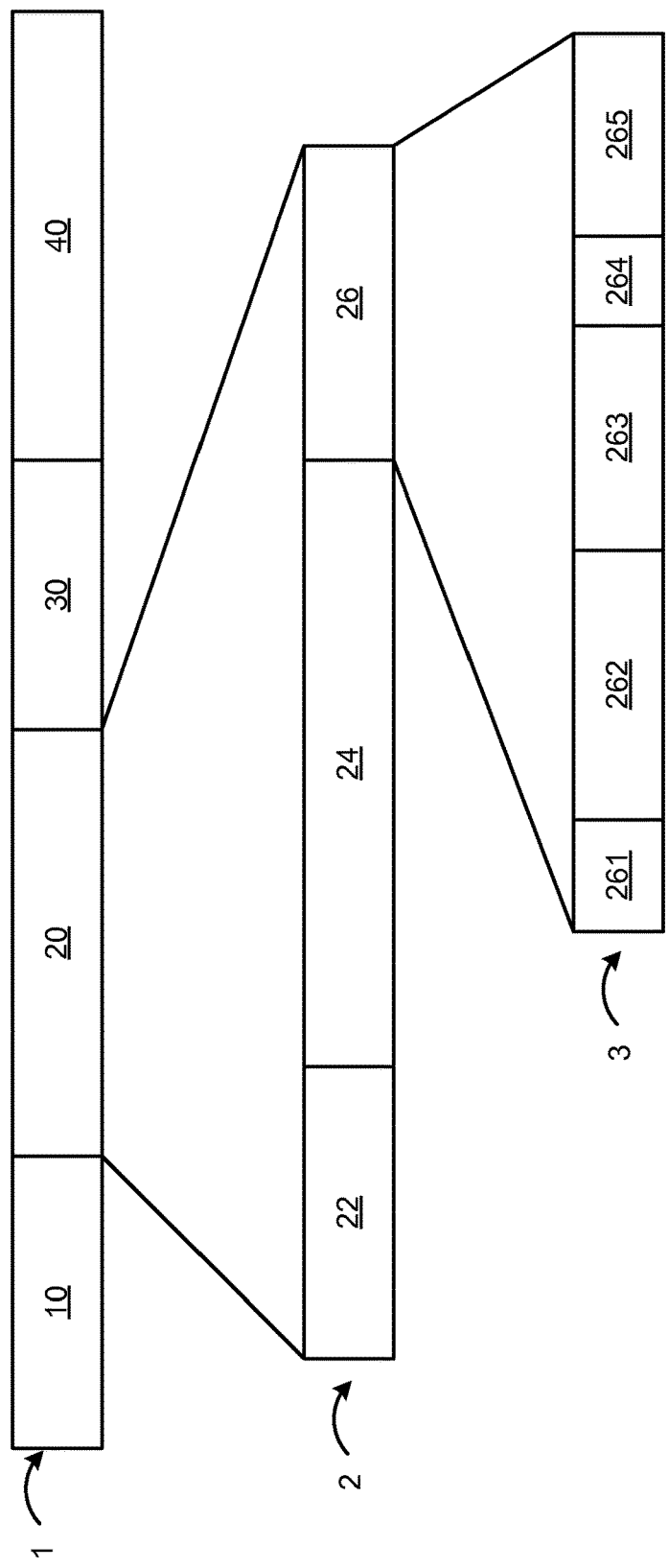
FIG. 1B is a diagram illustrating one embodiment of a hierarchical structure representing a user's contextual history at multiple levels of granularity.

FIG. 1B is a diagram illustrating slices that have been aggregated in a hierarchical structure representing a user's storyline at multiple levels of granularity, according to one embodiment. In one embodiment, slices are aggregated into chapters, which are in turn aggregated into books. A chapter comprises one or more temporally contiguous slices having similar semantic context. For example, the slices in a chapter have at least one common label. A book comprises one or more temporally contiguous chapters having similar semantic context. For example, the chapters in a book have at least one common label. The common labels unifying a book may have a higher level of abstraction than the common labels unifying a chapter. For example, a book has a common label corresponding to a state a user has visited, and chapters in the book have common labels corresponding to different cities that the user has visited.

At the bottom level 3, a chapter 26 is shown as being divided into five slices 261, 262, 263, 264, and 265. For example, the first slice 261 might be a cab ride from the user's hotel to an airport, the second slice 262 might be time spent at the airport, the third slice 263 might be a flight home, the fourth slice 264 might be time spent getting out of the user's home-town airport, and the fifth slice 265 might be a cab ride from the user's home-town airport to the user's apartment. Note that although it is not shown in FIG. 1B, the other chapters will typically also include one or more slices.

At the second level 2, a book 20 is shown as being divided into three chapters 22, 24, and 26. For example, continuing the previous example where the third chapter 26 is a journey home from a hotel, the first chapter 22 might be traveling from home to a ski resort and the second chapter 24 might be ten days of skiing. Note that although it is not shown in FIG. 1B, the other books will typically also include one or more chapters.

At the highest level 1 (representing the complete storyline), the user's storyline is divided into four books 10, 20, 30, and 40. For example, continuing the previous example where the second book 20 is a ski vacation (including travel), the first book 10 might represent a regular work week, the third book 30 might represent three days back at work after the ski vacation, and the fourth book 40 might represent a period of unemployment after the user quit his job to pursue a career as a ski instructor.

Although FIG. 1B shows a storyline that includes books, chapters, and slices, in other embodiments, storylines with different numbers of hierarchical levels are used. In addition, although the illustrated embodiment shows groups that are made up of contiguous slices, in some embodiments non-contiguous groupings are possible. For example, the storyline might include a book identified as "vacations" that includes a first set of slices corresponding to a weekend in Vegas in April and a second set of slices corresponding to a hike in Yosemite in August. As another example, the storyline might include a chapter identified as "Saturday shopping" that includes two sets of slices corresponding to retail stores in a mall separated by a brief visit to the user's office for a Saturday meeting.

Figure 2:
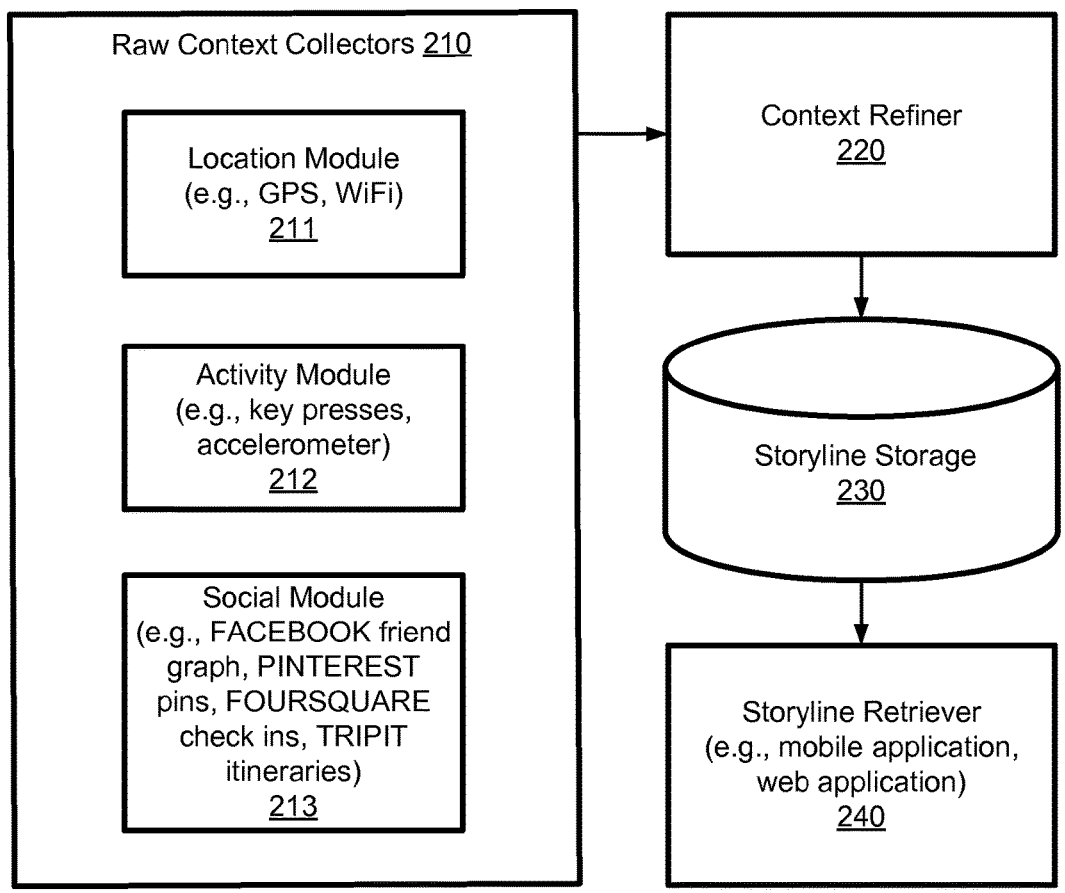
FIG. 2 is a block diagram illustrating the system environment for creating and using storylines in accordance with an embodiment.

FIG. 2 is a block diagram illustrating a system environment 200 for creating and using storylines, in accordance with an embodiment. The system environment 200 includes one or more raw context collectors 210, a context refiner 220, a storyline storage 230, and a storyline retriever 240. In one embodiment, the entities of the system environment may be contained on a single processing node, such as a user's mobile device, and in another embodiment, the entities of the system environment may be divided between the user's mobile device and a centralized processing node to decrease the processing requirements of the mobile device. An example distributed embodiment is one where the raw context collectors 210 are located on the user's mobile device and data is sent to a central device of context refinement, storage, and retrieval.

The raw context collectors 210 collect raw context data from observation sources, sensors, monitors, third party sources, and the like. A raw context represents a single observation and so is generally very specific, often carries little semantic information on its own, and is of high probability. Naturally, different observation sources may have greater degrees of noise and uncertainty or may inherently include semantic information. In the example illustrated in FIG. 1, the raw context collectors 210 include a location module 211, an activity module 212, and a social module 213, but different and/or other context collectors 210 may be included in other embodiments. For example, in various embodiments, the context collectors 210 include sensors for measuring device orientation (e.g., a compass), magnetic fields, user heart rate, and user stress level, as well as modules for audio and visual sampling of the user's environment.

Examples of location module 211 include a GPS receiver, and a Wi-Fi receiver that enable the location module 211 to determine an absolute or relative location of the user's mobile device, within a margin of error. Examples of the activity module 212 include, a monitor of key presses and/or screen touches that determines when a user is typing or otherwise interacting with the user's mobile device, and an accelerometer that measures the acceleration forces on the mobile device to determine movement and movement patterns of the mobile device. Examples of social module 213 include a FACEBOOK friend graph, PINTEREST pins, FOURSQUARE check ins, TRIPIT itineraries, and other social media data that identify a user's social acquaintances, activities, and locations. Other context collectors 210 used in some embodiments include health monitors that report metrics such as heart rate and blood pressure, connected instruments such as scales and blood pressure cuffs, and activity monitoring devices such as run trackers and sleep monitors.

The context refiner 220 receives the raw context data from the raw context collectors 210. The context refiner 220 groups the context data by combining the observations to create a more coherent representation of the user's context. The context refiner 220 may also attach semantic content to groups or sequences of context data to form storylines. In some embodiments, the context refiner 220 includes a plurality of context refiner sub-modules (not shown); one for each type of context data received from the raw context collectors 210. Each context refiner sub-module groups context data by combining the observations from the corresponding raw context collector 210 into slices in order to create a more coherent representation of the user's context indicated by the specific type of context data the sub-module is operating on. In one such embodiment, the context refiner 220 includes an additional refiner sub-module (not shown) that analyzes the multiple streams of contexts generated by the other context refiner sub-modules to detect overlapping slices and generate combined slices containing context information from the corresponding overlapping slices. The context refiner 220 aggregates slices to define groups at one or more hierarchical levels (e.g., chapters, books) that correspond to semantically meaningful concepts such as work days, work weeks, vacations, compound activities (e.g., a shopping trip made up of visits to multiple stores and the corresponding travel), and the like.

The storyline storage 230 receives the storylines formed by the context refiner 220 and stores them. Then, a storyline retriever 240 can access the stored storylines from storage 230. Examples of storyline retrievers 240 include mobile applications and web applications that use the storylines stored in storage 230. An example of an application that uses a storyline is a mobile phone application that displays the user's history, showing the user the places the user has stayed and the travel between the stays. Another example of an application that uses a storyline is a social application such as FACEBOOK or PINTEREST that allows the user to share all or part of his storyline with friends. The process of grouping context data and attaching semantic content to form storylines will be described in detail in the section below. The storyline retriever 240 may also refer to a module used to interact with the storyline storage 230 and that renders the storyline for display on a client device. For example, the storyline retriever 240 includes an application programming interface to enable convenient access by external applications and programs running on client devices.

Storyline Creation Process

Figure 3:
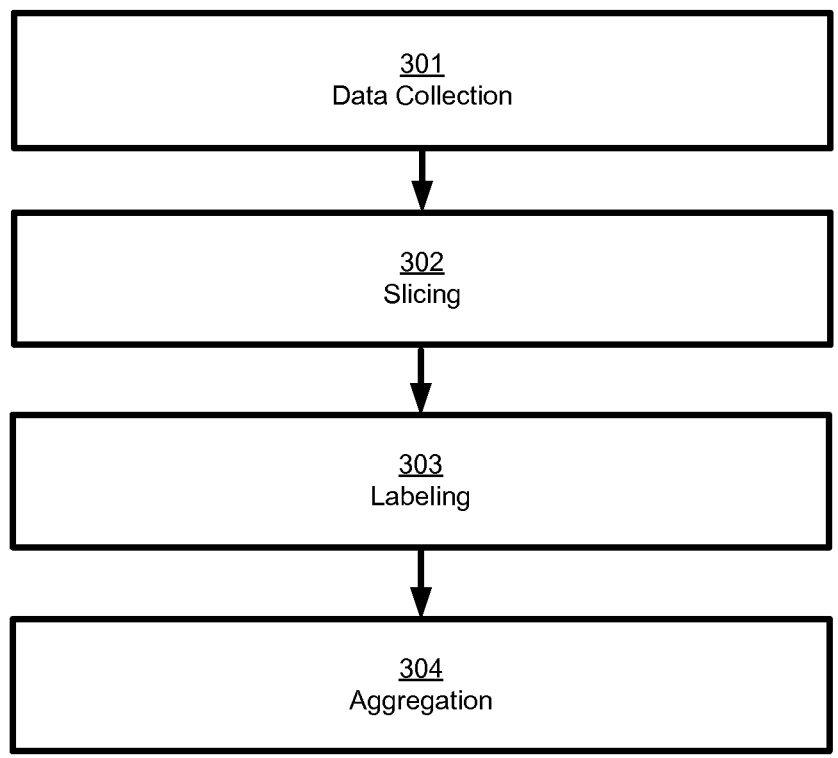
FIG. 3 is a flow chart illustrating a storyline creation process in accordance with an embodiment.

Embodiments of the invention divide the process of storyline creation into four phases: data collection, slicing, labeling, and aggregation. These phases are illustrated in the flow chart of FIG. 3, and described in detail in this section.

Data Collection 301

Data collection 301 involves accessing the various sources of information and observations of user behavior, optionally transporting their data to servers for analysis and storage (to offload CPU load and reduce battery usage), and translating the data into a collection of raw contexts for additional analysis. These observations may come from a variety of sources, including but not limited to the following:

- Location technologies (e.g., GPS, cell tower triangulation, Wi-Fi location), typically embedded in mobile devices like smartphones. The location technologies may be included, for example, in the location module 211 illustrated in FIG. 2.
- Activity data such as accelerometer data from mobile devices and device interaction notices (e.g. taps, key presses, power on). The activity data may be collected, for example, by the activity module 212 illustrated in FIG. 2.
- Ambient data from the user's environment (e.g., sound, temperature, or light intensity).
- Biometric data such as the user's skin temperature, galvanic skin response, heat flux, and heart rate. This data may be used to calculate caloric burn, stress level, sleep quality, and other indicators of the user's physical state.
- Social data from any networks or applications the user may use, such as FACEBOOK, TWITTER, FOURSQUARE, FLICKR, TRIPIT, or PINTEREST, as well as personal communication applications like email and text messaging. The social data may be collected, for example, by a social module 213 illustrated in FIG. 2. In one embodiment, the social data is made available to the social module 213 through application programming interfaces (APIs).
- Schedule data, such as from the user's calendar application.
- Explicit annotation created by the user to inform the system of a location (e.g., a "check in" at a baseball stadium) or activity (e.g., marking the time boundaries of a jog to track fitness goals).

Data collection 301 may be run as a constant ongoing process, with different techniques appropriate to different sources. Alternatively, data collection 301 may be run periodically at an interval appropriate for the application.

Slicing 302

One challenge with data collection 301 described above is that multiple sources of observation data may result in a collection of contexts that contain conflicting information. For example, an observation from the user's calendar may place him at a meeting downtown, while GPS observations may show him to be at the beach. Resolving these inconsistencies is key to the interpretation of the data. Slicing 302 is the process of refining an unorganized, multi-threaded collection of contexts produced by data collection into a consistent storyline composed of a sequence of contexts representing homogeneous time intervals. These homogeneous time intervals generally represent either a stay at one place or a process of travel from one place to another. In one embodiment, place information may be refined, in that each stay context defines an area that includes most of the individual points observed during that time. Travel contexts will generally have a start and end point, with some definition of the route between them (e.g., waypoints). In one embodiment, travel slices may be further annotated with mode of conveyance (such as driving, walking, flying, or riding a bus), and travel slices may be segmented into distinct slices for different modes of conveyance. For example, a trip involving a drive to the airport, a flight to another city, and a taxi to a hotel might be separated into three distinct travel slices. In another embodiment, no additional semantic meaning or activity information is added during slicing 302. Other types of data can be used to produce other types of slices, such as slices representing a period of consistent activity.

Figure 4:
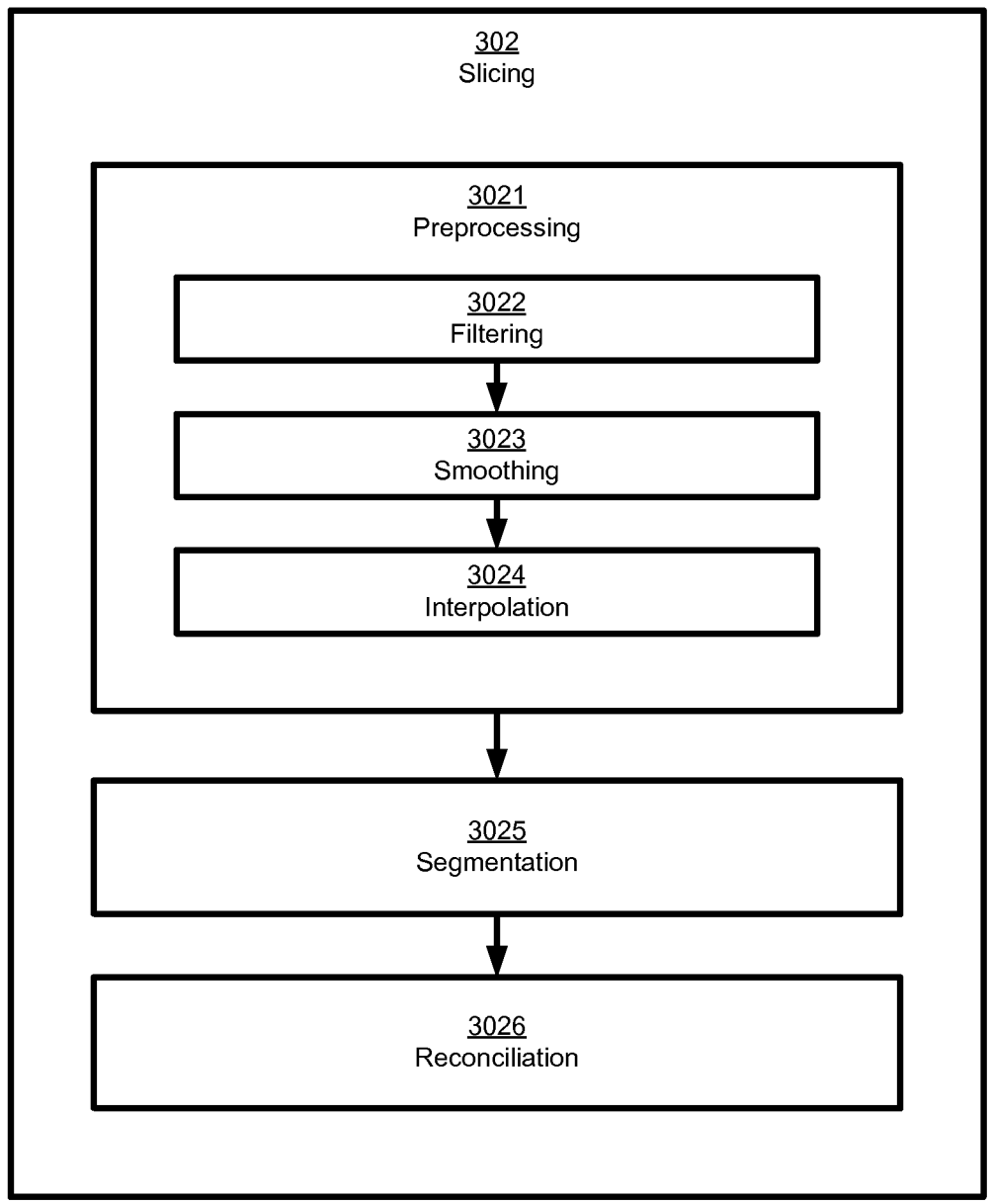
FIG. 4 is a flow chart illustrating a process of slicing in accordance with an embodiment.

Embodiments of the invention divide the process of slicing 302 into three phases: preprocessing 3021, segmentation 3025, and reconciliation 3026. Each of these phases is described in detail in this section, with reference to the flow chart illustrated in FIG. 4. The steps of FIG. 4 are illustrated from the perspective of the context refiner 220 performing the method. However, some or all of the steps may be performed by other entities and/or components. In addition, some embodiments may perform the steps in parallel, perform the steps in different orders, or perform different steps.

Preprocessing 3021

Since raw context data input into the slicing 302 process come from a variety of sources with varying degrees of inaccuracy, the raw context data are systematically groomed into a suitable form for later steps to minimize the amount of error in the output. In one embodiment, preprocessing 3021 involves a combination of filtering 3022, smoothing 3023, and interpolation 3024.

Filtering 3022.

Filters on raw context data eliminate from consideration raw context data that are deemed more inaccurate than some desirable threshold. The value of the filter threshold can be sensor-specific, due to different sensor error characteristics. For example, a GPS device's data uncertainty is calculated by physical factors related to the timing of signals received from the device's acquired satellites, so it can report a reliable estimate of sensor inaccuracy. In contrast, reported uncertainty is less reliable with location technology based on cell tower or Wi-Fi triangulation, which lack the measurement precision necessary to account for fluctuations in wireless signal strength, therefore the threshold for filtering 3022 those contexts may be higher. When using any location technology, the amount of filtering 3022 will depend on its expected error characteristics, and the error characteristics are expected to vary between sources of data. Optionally, default threshold values for filters may be set system-wide, set per sensor type, or based on user preferences. In addition to filtering 3022 by location technology, physically unlikely readings (e.g., traveling at higher speeds than possible) may also be filtered.

Smoothing 3023.

It is also helpful to later slicing phases for context grooming to smooth sequences of contexts from the same sensor when each individual context is noisy. Noise characteristics are hardware dependent, so the smoothing 3023 of each sensor should be parameterized to limit the noise expected from that sensor. For example, a certain accelerometer may generate noisy contexts at a high sampling rate, characterized by large magnitude swings in all axes. One way to smooth such data is to compute an average of the magnitude values over a time window and then output the smoothed magnitude values at a less frequent sampling rate. Smoothing 3023 is also used when different sensors conflict. For example, if there is minimal change in values across a series of accelerometer readings, it indicates that a device was immobile, which could contradict a series of location readings that would otherwise suggest the device was wandering due to inaccurate location technology. In general, the degree of smoothing 3023 will depend on the variability in data noise from each particular location technology.

Interpolation 3024.

Uneven sampling rates can also be due to power conservation, where a device chooses to go into a low-power, low sampling rate state, or is forced to by a governing operating system such as a mobile phone OS. It is common for sensors to be configured to increase sampling when the environment is changing, and to decrease it when the environment (from the sensor's perspective) is static. As slicing 302 occurs over a finite window of time, a decreased sampling rate could lead to relevant context data falling outside the window. Therefore, it is desirable in some cases to interpolate less frequent context data to ensure that the later phases of slicing 302 have sufficient data to analyze. Interpolation 3024 generates virtual context data between sensed context data. For example, when there is a gap between two location contexts, a number of interpolated context data points may be generated that correspond to locations between the two endpoints. Interpolation 3024 runs into the risk of adding contexts that should not exist. For example, if a sensor is not functional and therefore not reporting, a gap in contexts should not be interpolated. To prevent invalid interpolation 3024, sensor data may include an indication that there has been an interruption in contexts since the last time a sensor generated context. This may be the default behavior whenever a sensor is (re)started for data collection by the controlling data collection process. In addition, if there is an exceptionally long gap between context data from sensors, it may indicate an interruption even if the sensors fail to set the flag and would be treated as such.

Segmentation 3025

Segmentation 3025 involves determining distinct, contiguous series of slices from the groomed sensor data representing different activities. For example, the simple day of a user who is an office worker could be segmented into a stay slice located in the morning at her domicile, then a commute to work travel slice, a stay slice at an office, then a commute back home travel slice, followed by a stay slice in the evening at her domicile.

There are a variety of algorithms to segment the input raw context data into stays, travels, and gaps. For example, k-means clustering can be applied to find clusters of raw contexts (by location, or a distance function combining location and time). Stay slices can be distinguished from travel slices by the dispersion of location context and/or velocity data. Because k-means has fundamental limitations, other more sophisticated clustering algorithms can be used additionally or alternatively to extract slices.

Besides clustering, segmentation 3025 can also be performed by applying time-series analysis algorithms, using the variance of a sliding window of input contexts to detect inflection points in the distribution. When the variation across a subsequence of input context data differs from a subsequence before it, the algorithm divides the two subsequences into slices that can then be classified as a stay or travel. For example, a stay is distinguishable from a travel by the low amount of variance in each individual input context in the stay sequence to its centroid, the geographic average location.

Because there are a variety of algorithms that can be applied to segmentation 3025, each with different features and limitations, it is also possible to combine their resulting outputs with a meta-segmenter. This meta-segmenter can pick and choose slices output with the highest associated probability among all constituent segmentation algorithms.

Segmentation 3025 can also be followed by filter and merge steps that smooth the output slices. Filters can remove short slices with more uncertainty associated with the contexts included therein, e.g., those with few actual sensor observations, and merge adjacent segments that are likely to be the same activity. The thresholds on minimum required observation uncertainty or distance from adjacent segments for filtering and merging can be parameterized to control the false positive rate (groups of raw context data that should not have been segmented) compared to the false negative rate (groups of raw context data that should have been segmented but were not).

Reconciliation 3026

In one embodiment, the final phase of slicing 302 deals with resolving newly generated slices with existing contexts generated from a previous slicing 302 run. While this reconciliation 3026 is optional—if it were computationally feasible to run slicing 302 on an entire raw context set, the brand new contexts could simply replace the older ones—in some cases reconciliation 3026 provides desirable qualities for the purpose of presentation. For example, it is desirable not to change contexts and slices in a user's history that have been previously displayed to the user, unless new data is in significant conflict, because the instability in data shown to the user would appear inconsistent. Instability is even less desirable in cases when the user has performed some operation on a previous context or slice, such as manually labeling or otherwise attaching metadata to it, that the subsequent slicing 302 run would overwrite. As such, there are rules governing when new slices and contexts can replace preexisting data in a user's history.

One way to limit the scope of changes between new and preexisting slices is to specify a time window within which preexisting data may be changed or replaced. Any data outside the window (i.e., older than a certain age), would be left unchanged in later slicing 302 runs. Contexts from newer slices are then integrated into the eligible preexisting slices by comparing type (stay or travel) and time spans. If a new slice is of the same type and begins and ends at approximately the same time as an existing slice, it could retain the same metadata of the existing slice, including any identifier labels (ids) and contexts. When a new slice and old slice overlap in time but conflict in type, the process can prefer the new slice except when there has been manual intervention, for example when a user has already interacted with the existing slice or confirmed it in some way using a user interface. Finally, the last slice is most likely to have changed due to new data, and could have its ending time extended if it aligns with a new slice starting at a time near its own start time, or completely replaced if the type changed (if a previously presumed stay were actually the beginning of a travel slice, for instance).

Labeling 303

Labeling 303 is the process of adding more specific and semantically meaningful data to the slices produced by slicing 302. In one embodiment, some or all of these labels are themselves contexts associated with the slices. In particular, labeling 303 adds geography (such as a slice's city or neighborhood), venue (public places, businesses, or personally significant places like "home"), and activity (such as "working", "eating", or "going to see a movie"). Note that the process of labeling 303 may suggest a revision in slicing 302, such as when the labeling 303 process determines that a user was eating and then seeing a movie at the theater next door, while the slicing 302 phase represented both activities as a single slice, prompting the single slice to be split into two successive slices, taking place at distinct venues.

A slice can be labeled using identifiers from predefined data sets, such as public venue records, or automatically generated, for example using a reverse geocoding system that converts latitude and longitude coordinates into an approximate street address. The labeling 303 process uses these data sources to apply probable labels to each slice. Some labels are exclusive while others may coexist alongside one another. Example data sources for the labeling 303 process include:

- Public venue database—a set of geographically annotated public venue names, such as businesses, public spaces, or landmarks. The venue data should be able to be queried geographically (e.g., to find likely venues within some specified distance of the slice's observed location observations); therefore, the venue data should include a location represented either as a single point (latitude, longitude, altitude) or as a set of points that defines or approximates a perimeter of the venue's geographic footprint. The venue may also contain a unique identifier, which is useful, for example, to use to associate the venue with manually entered observations from the user. In addition to location and name, the data entry for the venue may contain other metadata such as address, business hours, categories describing the type of venue, and reviews useful to present back to the user. Because the set of public venues changes over time, this database may be configured to receive updates whenever available.
- User-specified database of places—a set of manually or automatically generated locations considered private to the user, identified by location and optionally by name and other metadata the user chooses to attach. The purpose of this database is to provide labels for slices that cannot be associated with public venues due to gaps in coverage. For example, many homes are not public venues and therefore would not be found in any public venue database, so a user may need to manually label his/her home. Labels such as "home" and "work" can also be automatically inferred.
- A set of additional labels associated with certain venue metadata such as a venue category. These labels could include descriptions of activities commonly applicable to the venue category (e.g., "jogging" at public parks or "dining out" at restaurants). These labels may be either predefined or automatically extracted, e.g., by analyzing the texts of some corpora such as online reviews. As with venue or place, the user can manually apply an activity label to a slice, or the labeling 303 process can infer it based on a model of likelihood given the input context.
- Public and user-specific calendar data—listings of public events and private appointments that can then be applied to matching, consistent slices.
- A database to store user corrections to automatically applied labels that were made by the system in error. This database has multiple uses. First, in the case of continuous slicing 302 and labeling 303, the correct label can be used during reconciliation 3026 to prevent incorrect labels from being reapplied. Second, the presence of the correction indicates with high confidence what the correct description for the slice is, and can influence future automated labeling 303 decisions for similar slices. The user corrections may be stored, for example, in storyline storage 230 or similar data store accessible by the context refiner 220.

Figure 5:
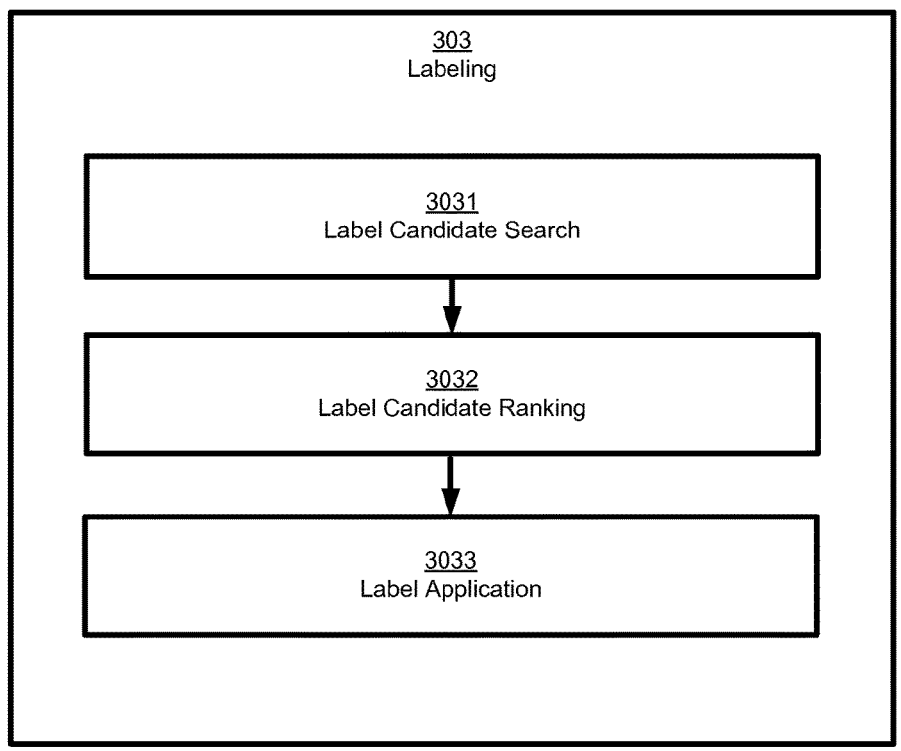
FIG. 5 is a flow chart illustrating a process of labeling in accordance with an embodiment.

Conceptually, it is possible to view the labeling 303 process as a collection of subprocesses responsible for outputting one type of label at a time. Labels of different types can then be run simultaneously on slices, or chained when one type of label is triggered by the presence of another (i.e., activities that are category- or venue-specific are only considered when a preceding labeling 303 subprocess applies a corresponding category or venue label, respectively, to the slice). In general, the labeling 303 process can be broken into three phases: label candidate search 3031, label candidate ranking 3032, and label application 3033, illustrated in FIG. 5.

Label Candidate Search 3031

In the label candidate search 3031 phase, the label sources are first queried to discover possible labels based on the slice's existing contexts. The following provides examples of how various label types can be searched.

Venues and places are found based on the slice's location, which by definition is a consistent estimate of a user's location over a period of time. However, there is a degree of uncertainty when using the associated slice location. Essentially, raw sensors providing locations are imprecise. The label candidate search 3031 phase does not rely on the exact location represented by the slice, but instead expands the search within some radius calculated as an estimate of the uncertainty. For example, if a slice's location was calculated using Wi-Fi triangulation, the triangulation error is often in the tens to low hundreds of meters, so the search process may query for venues and places centered at the slice location within two hundred meters.

Events and appointments can be found based on the slice's location and time boundaries. An event at a venue would be matched against the overlapping time boundaries between the event and the slice. Appointments are also matched against location and time. Because event and appointment time boundaries are imprecise, and slice time boundaries may be imperfect, the slice's time boundaries do not need to exactly match those of an event or appointment. For example, the label candidate search 3031 determines a slice's time boundaries so that the slice's beginning time and the slice's end time are within a threshold of a corresponding time or an event or an appointment. Similarly, the slice location does not need to be an exact match either. The label candidate search 3031 finds possible events and appointments within the likely uncertainty radius of the slice location, where the likely uncertainty is based on precision of the sensor determining the location.

Several methods may also be used to find candidate activities. For example, based on the category and/or venue labels already applied to the slice, the label candidate search 3031 process can bring up associated activity labels. As another example, the slice context can be compared to similar slices in the past if the user had previously labeled activities manually. For example, if a user previously labeled an activity as being at the same venue or a venue in the same category as the slice that has not yet been labeled with an activity, that activity would be considered as a candidate for labeling the slice.

Label Candidate Ranking 3032

Once a set of label candidates of a given type are found, the likelihood of each one given the contexts already associated with the slice is evaluated. In one embodiment, the likelihood of each label is computed and the labels are ranked. There may also be a threshold for likelihoods, such that if no label is deemed likely enough, none is applied to the slice at all—this avoids the case of having a label (e.g., an incomplete label) applied inappropriately. In one implementation, slices are constrained to only having one label of some types (e.g., venue labels), and the top-ranked label meeting the minimum likelihood threshold is applied to the slice. For other label types, multiple labels can be valid for a single slice, and all labels meeting the minimum threshold of likeliness are applied.

Likelihoods are calculated by scoring a candidate label given the contexts already associated with a slice. A model is defined to be an algorithm for computing likelihoods given slice context. Models treat the various aspects of a slice context as features. Some example features include:

Slice location—while the label candidate search 3031 also uses location to discover the set of eligible labels to apply, a ranking model can further determine the likelihood of a label given its distance to the slice location, or relative likelihood between several candidates (e.g., a venue that is significantly farther from the slice location would to considered less likely, but two venues that differ only a small amount in distance from the slice location may be considered equally likely given the location context, all else being equal).

The particular user whose slice is being labeled—since users have individual differences, a model may use specific algorithms tailored to each to achieve the best labeling accuracy. One example of how an individual user could affect label candidate ranking 3032 is for the ranking process to use the user's accumulated history of slices and labels, some of which the user may have explicitly confirmed to be accurate. Labels that occurred more often in the user's history may be considered more likely when labeling new contexts.

The beginning and end stay times—since different labels are more likely to occur at different times (e.g., restaurants at meal times, rock concerts in the evenings), and events, appointments and activities last for different lengths of time (e.g., movies between 1.5-3 hours), the likelihood of a particular label can depend on the corresponding day and time range.

Besides the context provided by the slice, models can use other sources of information to inform the likelihood estimate. Some example information sources include:

Venue hours of operation—used to reduce the likelihood that a venue be applied to a slice when it's known to be closed during some significant portion of the slice's time boundaries.

Venue popularity—e.g., relative popularity over all time compared to other venues, or historic popularity at the time of day, day of week, which can indicate the likelihood that the label is applicable given the slice's time boundaries. If the duration of the slice is known, it can also be compared to the distribution of stay durations at the venue to determine whether the length of time spent in one place is consistent with other visits to the candidate venue.

Category popularity—used when data is scarce about specific venues in the candidate list. This can also be relative to time of day, day of week, and can also include typical stay durations so that the slice's time boundaries factor into the likelihood calculation.

Routine—considering how often in the past the user has similar slices with the candidate label, can determine whether a certain label is more likely (if there are many such instances) or less likely (if there are few or no instances). Routine is not limited to only considering a specific user's historical patterns. Users might be clustered into cohort groups, or even aggregated into a global routine model, depending on data scarcity due to limited interactions with the system or the area where the slice occurs.

Social interest—some users are more likely to visit a venue if their friends recommended it, if they have been there before, or were labeled as being there during an overlapping time period by the labeling 303 process. Some of this information is available through existing social network APIs, for example recommendations may be based off of a friend "liking" the venue on FACEBOOK. Information about a user's friends visits to a venue can also come from a friend "checking in" or retrieved from the storyline storage 230 (in embodiments where contextual history storage the is centralized).

Label Application 3033

One or more models can be run to process a slice's context(s) into labels, which are applied in label application 3033. Conceptually, multiple models can be represented by a single meta-model that runs the appropriate features through its composing models. Once the meta-model outputs probabilities, labels deemed sufficiently likely are applied to the slice. In one embodiment, labels that are not deemed to be sufficiently likely can still be surfaced as options to the user should he/she wish to alter the label set by adding new labels, with the label candidate ranking 3032 intact. In such cases, it is not necessary for the same meta-model to produce the label candidate ranking 3032—different meta-models can rank labels differently to produce whatever is specified by the system design of a particular embodiment.

In one embodiment, automatic label application 3033 does not require that every label is ranked solely by likelihood. For example, when users interact with the label candidates (e.g., to manually apply labels), it can be desirable to present candidate labels in different orders to make finding desired labels easier. For example, an alphabetical order or a hybrid order that incorporates both likelihoods and lexicographical positions can be used. Once labels are applied to slices, the additional contextual data is presentable to the user and available for further processing in a variety of forms.

Aggregation 304

Figure 6:
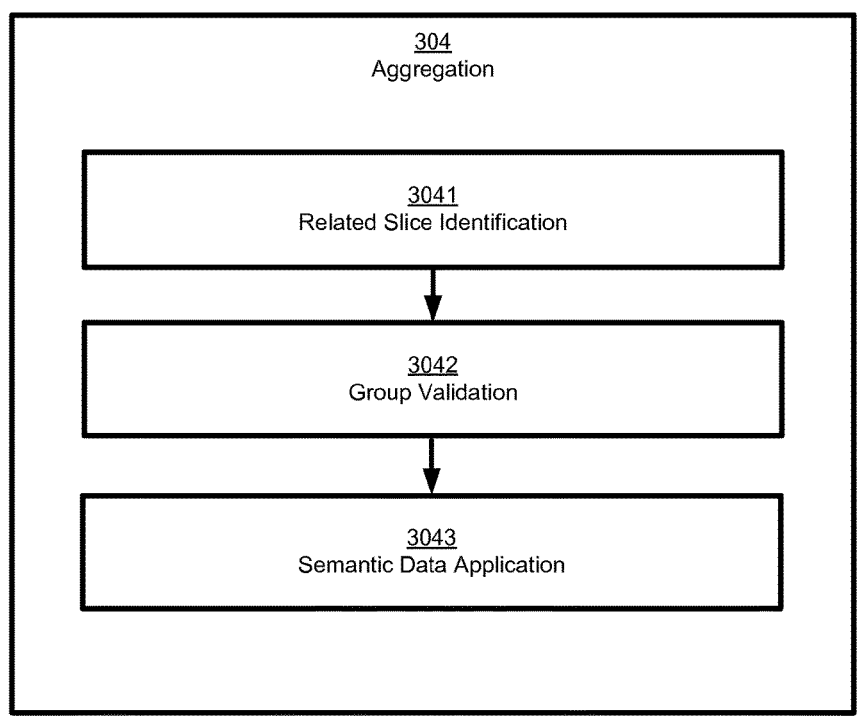
FIG. 6 is a flow chart illustrating a process of aggregating slices into a chapter in accordance with an embodiment.

FIG. 6 is a flow chart illustrating a process of aggregating slices into a chapter in accordance with an embodiment. The collection of labeled slices in a user's storyline provides a great deal of fine detail about the user's day-to-day movements and activities. However, users generally consider their lives as collection of time periods with some semantic meaning attached to each period, with a range of levels of abstraction. For example, a work day might include a morning commute, a morning at work, a walk to a restaurant, lunch, a walk back to the office, an afternoon at work, and an evening commute, each represented by a labeled slice. However, in many instances, a summary of a user's experiences at a high level (e.g., as groups of slices) is more valuable than a summary of a user's experience at a low level (e.g., as individual slices). Aggregation 304 is the process of identifying groups of slices that correspond to at least one semantic concept and storing these groups as part of the user's storyline. Unlike during the slicing 302 process, where raw contextual data is merged to create slices, aggregation identifies higher-level events (groups) that include one or more slices; both the group and the individual slices are included in the storyline.

In one embodiment, users are presented with their hierarchical storylines in an interface that enables them to drill-down and drill-up through the various levels of the hierarchy. For example, a graphical user interface presents the storyline with various interface objects (e.g., shapes, text, images, other media content, or a combination thereof) that represent slices and groups of slices. Responsive to a user command (e.g., a stretch gesture, selection of an interface object), directed at an interface object representing a group of slices, the user interface displays interface objects representing the slices in the group. Responsive to an additional user command (e.g., a pinch gesture, selection of a button) when the user interface displays interface objects representing slices, the user interface displays an interface object representing a group of the slices.

Embodiments of the invention divide the process of aggregation 304 into three phases: related slice identification 3041, group validation 3042, and semantic data application 3043. Each of these phases is described in detail in this section, with reference to the flow chart illustrated in FIG. 6. The steps of FIG. 6 are illustrated from the perspective of the context refiner 220 performing the method. However, some or all of the steps may be performed by other entities and/or components. In addition, some embodiments may perform the steps in parallel, perform the steps in different orders, or perform different steps.

Related Slice Identification 3041

During related slice identification 3041, the context refiner 220 uses data from one or more sources to identify groups of slices that may collectively describe a single semantic concept. In one embodiment, data from a user's calendar and/or social applications are used to identify slices that correspond to a particular event. For example, if the user has created an itinerary on TRIPIT (or another application storing an itinerary through various geographic locations), slices having times between an itinerary start time and an itinerary end time can be identified as related. As another example, a range of slices that is bounded by a travel from and to the user's home (e.g., a work day) can be identified as related. As yet another example, all slices falling within a time-range defined by an event on the user's calendar can be identified as related. In one embodiment, a chapter type can be specified that identifies a pattern of slices. The context refiner 220 recognizes any sequence of slices that matches the pattern as an instance of the chapter type. The pattern could be a sequence of specific venues, venue categories, venue attributes, and/or any combination of these. For example, "work"→"travel"→<restaurant category>→"travel"→"work" generically describes "going out for lunch" sequences involving any restaurant visited during the workday. Thus, the context refiner 220 can automatically identify and aggregate sequences of slices that match the pattern in a way that may be more semantically meaningful than the individual slices in the sequences. Such patterns can be created in various ways, including manually authored by the system designers, manually authored by users, and/or automatically generated from sequence data via machine learning algorithms. In other embodiments, different and/or additional data sources are used by the context refiner 220 to identify related slices.

Group Validation 3042

Once groups of related slices have been identified, the context refiner 220 determines which of those groups are likely to correspond to a semantic concept during group validation 3042. In many instances, the information associated with one or more of the identified groups will contradict other identified groups and/or slices. For example, if a group is identified based on a TRIPIT itinerary for a trip to Mexico that the user did not take, the resulting group, which is expected to contain slices located in Mexico, will in fact contain slices indicating the user was at home. The context refiner 220 considers one or more factors in determining which of the identified groups are likely to correspond to an actual event (or other semantic concept). In one embodiment, the context refiner 220 ranks the possible sources of location data and, when conflicting location data is identified, uses the data from the most highly ranked source. For example, the context refiner 220 might consider GPS data from the user's mobile device to be the most reliable (as this is difficult to fake), followed by events on the user's calendar, with data obtained from social applications being considered the least reliable. Thus, in the example given above regarding a planned trip to Mexico, the GPS data indicating the user was at home outranks the itinerary data received from TRIPIT, and the context refiner 220 may infer that the user did not take the planned trip and/or may ask the user to confirm any inferences. In other embodiments, different and/or additional sources of location data are used, and the sources are ranked in different orders.

In one embodiment, in which only a single hierarchical level of grouping (chapters) is used, chapters are not allowed to overlap with each other. Thus, if two identified groups of slices overlap, the context refiner 220 determines which one is more likely to represent an event or other meaningful semantic concept. Various methods can be used to determine which grouping to keep, such as favoring longer groupings over shorter groupings, favoring groupings with greater certainty of accuracy for the slices therein, favoring groupings based on higher ranked sources (e.g., as described above with reference to a planned trip to Mexico), favoring groupings that the user has explicitly indicated (e.g., those based on a calendar event the user created) over those based on implicit data, and the like. In other embodiments, a plurality of hierarchical levels are used and the context refiner 220 attempts to resolve conflicts between overlapping groupings by analyzing whether one is a lower level event that is bounded by another. In one such embodiment, the bounds of groups are in part determined by requiring that a group at a higher level begins and ends at times corresponding to the beginning and end of groupings (and/or individual slices) in the level below. For example, the skiing vacation book group described earlier begins at the same time as the cab ride to the airport and ends at the same time that the user arrives back home. In yet another embodiment, multiple storylines may cover the same or overlapping sets of slices without necessarily being related at all. For example, if Alice travels to France and meets Bob there halfway through her visit, and then both travel to Germany together, Alice's storyline may contain the semantic groupings "France visit" and "travel with Bob." These groupings overlap, but neither fully contains the other. Disjoint storylines are another example of overlap; Alice may have storylines for "places I ate" and "famous landmarks," both of which include a famous restaurant.

Semantic Data Application 3043

At the conclusion of group validation 3042, the context refiner 220 has determined the structure of a hierarchical storyline, with individual slices at the lowest level and one or more levels of grouped slices corresponding to events or other semantically meaningful groupings. The next stage of aggregation 304 is to add semantic data to each group using a process referred to herein as semantic data application 3043. This process is similar to labeling, but applied to groups rather than individual slices. The goal of the process is to provide a short description for each group that explains to the user why the grouping was made. For example, if a chapter corresponds to a collection of slices in Yosemite National Park in August 2013, the context refiner 220 might add the description "Yosemite, August 2013." If that chapter is in turn part of a book that includes trips to multiple national parks throughout July and August, the context refiner 220 might describe the book as "National Park Tour: Summer 2013." In various embodiments, the information used to identify groupings comes from various sources, including public venue databases, user specified databases, the user's calendar (descriptions of events), the user's social applications (e.g., venues the user checked in at on FOURSQUARE), information obtained by prompting the user to describe an unidentified grouping, and the like. In embodiments where pattern rules are used to detect certain kinds of chapters, patterns may be similarly used to determine semantic labels, such as "<city>, Trip, <year>".

Once the hierarchical storyline structure has been built and the various groupings provided with descriptive information, the storyline is presentable to the user and available for further processing in a variety of forms. As described above, one use of the storyline is to offer a historical perspective to the user, who may peruse the storyline to view his/her previous activities, drilling up and down through the levels of the hierarchy. The storyline data is also available for further processing into additional interesting aggregations, such as demonstrating how often certain activities were performed within some time period, or for processing by other software applications.

Organizing Contextual Data into Groups of Contextual Slices

Figure 7:
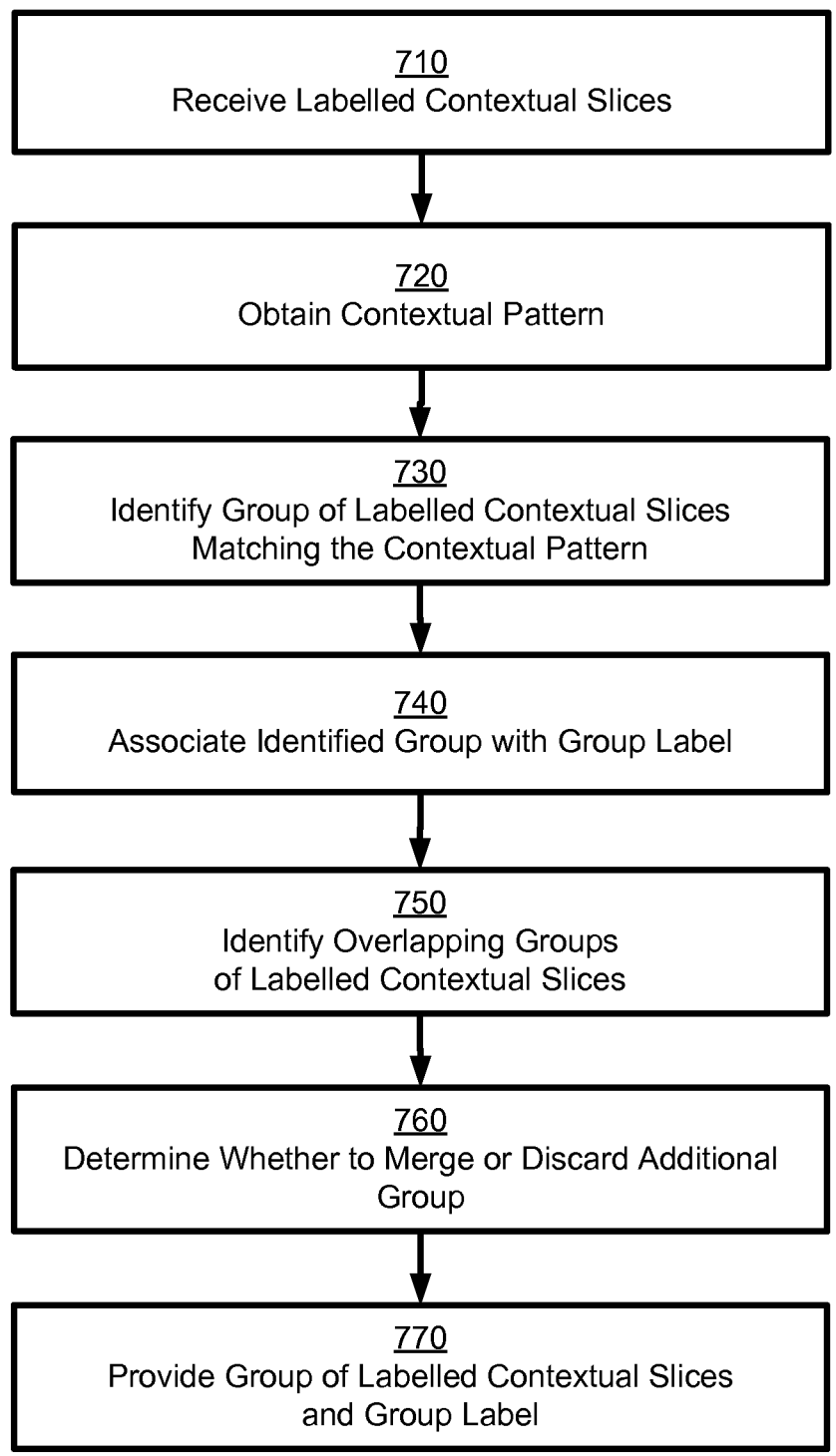
FIG. 7 is a flow chart illustrating a process of organizing contextual data into a group of slices, in accordance with an embodiment.

FIG. 7 is a flow chart illustrating a process of organizing contextual data into a group of slices, in accordance with an embodiment. The steps illustrated in FIG. 7 may be performed in a different order. For example, a step listed after another step may be performed before the other step, concurrently with the other step, or at least partially overlapping with the other step.

The context refiner 220 receives 710 a plurality of labelled contextual slices derived from contextual data of a user. Collection of contextual data is further described in conjunction with FIG. 2. A contextual slice includes a time range, a location. The time range includes a start time and an end time, which may respectively correspond to earliest and latest timestamps of contextual data used to derive the contextual slices. For example, if the contextual slice is derived from a calendar entry, the start time and end times span the time duration of the calendar entry. The location may include one or more locations. If the contextual slice has a stay type (i.e., the contextual slice corresponds to a stay at a location), then the location of the contextual slice is the centroid of the stay. If the contextual slice has a travel type (i.e., the contextual slices corresponds to travel between locations), the location of the contextual slice may include a start location, an end location, or an intermediate location passed by the user during the travel. Organizing contextual data into contextual slices is further described in conjunction with FIG. 4.

A labelled contextual slice is a contextual slice with a contextual label. The contextual label is a semantic description or generalization of the labelled contextual slice. In one embodiment, the contextual label specifies one or more of a time period, a place, and an activity inferred from the contextual data of the user. The time period reflects a semantic description (e.g., mid-morning) of the time range (e.g., 9-10 am) included in the contextual slice. The place is a semantic description (e.g., home) of the location (e.g., latitude and longitude coordinates) included in the contextual slice. The activity is a semantic description (e.g., errands), which may be determined from contextual data (e.g., from social media, from correspondence) or inferred from a correlation with a time period label or a place label of the contextual slice. Because contextual labels are associated with different likelihoods, a contextual slice may be associated with multiple contextual labels (e.g., contextual labels having at least a threshold likelihood of association with the contextual slice). Additionally, contextual labels are hierarchical, so a contextual slice associated with a specific contextual label may be associated with additional contextual labels that are generalizations of the specific contextual label. For example, a contextual slice associated with "mid-morning," "Mountain View," and "biking" contextual labels is associated with additional contextual labels that are further generalizations, such as "morning," "daytime," "San Jose," "California," and "exercise." Labelling a contextual slice is further described in conjunction with FIG. 5.

In one embodiment, the context refiner 220 obtains 720 a contextual pattern specifying a sequence of contextual labels or a sequence of criteria met by contextual labels of successive contextual slices. The criteria may specify one or more mandatory contextual labels (e.g., "walking"→"eating" and "evening"→ walking), lists of sufficient contextual labels (e.g., "walking" or "biking"→"picnicking" or "dining"→"walking" or "biking"), categories or types of contextual labels (e.g., <travel type>→<restaurant place category>→<travel type>), or a combination thereof. To determine whether a temporally contiguous sequence of labelled contextual slices matches the contextual pattern, the context refiner 220 searches the received labelled contextual slices for a temporally contiguous group of contextual slices having the sequence of contextual labels indicated by the pattern. In an embodiment where contextual labels have a likelihood of association with a contextual slice, the pattern may include threshold likelihoods to match the pattern.

In one embodiment, the context refiner 220 obtains 720 the contextual pattern by identifying a recurring contextual pattern in the received labelled contextual slices using a machine learning algorithm. For example, the machine learning algorithm takes as input the labelled contextual slices received for a user and trains the recognize patterns having at least a threshold number of contextual slices. The machine learning algorithm outputs the obtained patterns. For example, the machine learning algorithm identifies multiple contextual patterns, ranks the identified contextual patterns by how many sequences the contextual patterns apply to, and selects contextual patterns having at least a threshold ranking. The machine learning algorithm may explicitly verify contextual patterns with the user or may remove patterns based on implicit user feedback such as a user correcting a group of labelled contextual slices identified using a contextual pattern.

In one embodiment, the context refiner 220 obtains 720 the contextual pattern by receiving additional groups of temporally contiguous labelled contextual slices identified by the user. The context refiner 220 identifies one or more contextual patterns from a common temporal sequence of contextual labels identified at least a threshold number of instances among the additional groups of temporally contiguous labelled contextual slices. Contextual patterns may also be obtained based on an analysis of anonymized contextual slices from various users. Contextual patterns may also be retrieved from a storage containing previously inferred or received contextual patterns.

In one embodiment, the context refiner 220 identifies 730 a group of labelled contextual slices from the plurality of labelled contextual slices, where the group of labelled contextual slices matches the contextual pattern. For example, the context refiner 220 identifies a first labelled contextual slice satisfying the first criterion of the contextual pattern. Continuing the example, the context refiner 220 determines whether the labelled contextual slice immediately after the first contextual slice satisfies the second criterion of the contextual pattern. The context refiner 220 continues this example process of checking successive, temporally contiguous contextual slices for any remaining criteria of the contextual pattern. If the contextual slices of the sequence meet the criteria of the contextual pattern, then the context refiner 220 identifies that sequence as the group of labelled contextual slices.

The context refiner 220 associates 740 the identified group with a group label, which indicates a common semantic description of the group of labelled contextual slices. For example, a group of contextual slices corresponding to a vacation are associated with the group label "Seattle: Summer Vacation 2014." The group label may be determined based on the contextual labels of the contextual slices in the group. Alternatively or additionally, the group label is received from the user.

In one embodiment, the context refiner 220 associates 740 the identified group with a group label using a label template related to the contextual pattern used to identify the group. The label template specifies one or more contextual categories used to generate a group label and may also include one or more text strings. One example label template is "<city>: <season> Vacation <year>." In the example label, <city>, <season>, and <year> are contextual categories and "Vacation" is a text string. The context refiner 220 identifies one or more contextual labels for the group of labelled contextual slices that represent the group. An identified contextual label fits in one of the contextual categories in the label template. To determine if a contextual label represents the group, the context refiner 220 determines whether the contextual label describes at least a threshold proportion (e.g., the majority, all) of the contextual labels. For example, the contextual slices include contextual labels indicating that the contextual labels took place in Seattle, so the context refiner 220 identifies the contextual label "Seattle" as describing the group. The context refiner 220 generates the group label (e.g., "Seattle: Summer Vacation 2014") by using the identified contextual label in the pattern template.

In one embodiment, the context refiner 220 associates 740 the identified group with a group label using the most specific contextual label from the group that describes a threshold proportion of the labelled contextual slices in the group. The context refiner 220 selects a contextual category specified by at least a threshold number of contextual labels in the group. The context refiner 220 identifies contextual labels in the selected contextual category at varying levels of generality. The identified contextual labels describe at least a threshold proportion of contextual slices of the group. For example, if the selected contextual category is <activity> and if the contextual slices of the group have contextual labels including "hiking," "biking," "playing tennis," "exercising," and "being outdoors," then the contextual labels "exercising" and "being outdoors" are identified because they describe a majority of contextual slices in the group. The context refiner 220 then selects the group label from the identified contextual labels. The selected group label has the highest level of specificity among the identified one or more contextual labels. In the previous example, the specific contextual label "exercising" is selected over the more generic contextual label "being outdoors."

The storyline refiner 220 stores an identified group of labelled contextual slices in storyline storage 230 along with the associated group label. In one embodiment, the group of labelled contextual slices is placed in a storyline that contains similar groups of labelled contextual slices. For example, the storyline includes groups having group labels that include common contextual labels or that include common contextual labels in a category of contextual labels. As another example, a storyline includes groups of labelled contextual slices identified using the same contextual pattern, or using contextual patterns having a common type. Contextual patterns of the same type are contextual patterns that have similar semantic meanings. For example, two example contextual patterns used to detect contextual slices in a road trip specify the sequences (1)<hotel category>→"travel"→"eating lunch"→"travel"→<hotel category>" and (2)<hotel category>→"travel"→"eating dinner"→"travel"→<hotel category>.

In one embodiment, the context refiner 220 identifies additional groups of contextual slices, some of which include common contextual slices. In other words, some identified groups of contextual slices may overlap in time. The context refiner 220 identifies 750 overlapping groups of contextual slices and determines whether the identified groups have at least a threshold number (e.g., 1, 2, a majority) of contextual slices in common with the group of labelled contextual slices. In response to determining that overlapping groups have at least a threshold number of contextual slices in common, the context refiner 220 determines 760 whether to discard either of the overlapping groups.

In one embodiment, the context refiner determines 760 whether to merge or discard overlapping groups depending on whether the overlapping groups refer to similar topics. Group labels having at least one matching non-temporal contextual label may indicate that their associated groups have similar context. For example, if the group labels are "July 28 Work Week" and "July 28 Marathon Training," then the groups refer to different topics even though they have a matching temporal contextual label. Group labels that have non-temporal contextual labels in the same category may refer to similar topics. In one embodiment, if the groups do not refer to similar topics, then context refiner 220 discards neither of the groups. If the groups refer to similar topics, then the context refiner 220 discards one or both of the groups. To select which group to discard, the context refiner 220 may determine which group is shorter or which group is associated with a lower likelihood. For example, the likelihood of a group may be determined based on the likelihoods of that group's contextual labels.

In one embodiment, if the groups refer to similar topics, then the context refiner 220 merges the groups. For example, if the groups have identical group labels and are temporally contiguous, then the context refiner 220 combines the overlapping groups into a single group with a common label (e.g., the group label from the group with more contextual slices or with a higher average likelihood of contextual slices).

The storyline retriever 240 provides 770 the group of labelled contextual slices and the group label to the user. In one embodiment, the storyline retriever 240 provides 770 the group of labelled contextual slices and the group label as part of a storyline including other groups with their own group labels. The storyline may be provided 770 in a user interface displaying a visual representation (e.g., a shape, an image) of the group of labelled contextual slices labelled with the group label. For example, the use interface displays visual representations of the groups against a timeline axis. The user interface is configured to display visual representations of the identified contextual slices in response to a user input directed at the visual representation of the group. In other words, the user interface can zoom-in (to see contextual slices) or zoom-out (to see groups of contextual slices) to display the user's context at different levels of temporal granularity.

In one embodiment, the user interface may request the user to verify whether the group of labelled contextual slices is accurate and whether the group label describes the group of labelled contextual slices. The user may make corrections to the group label or the grouping of labelled contextual slices. For example, the user may modify which labelled contextual slices are part of a group or may reject the group outright. The user's correction is received by the storyline retriever 240, which stores an updated version of the group label or the group in response to receiving the correction.

Additional Configuration Considerations

A computer is adapted to execute computer program modules for providing the functionality described herein. As used herein, the term "module" refers to computer program logic utilized to provide the specified functionality. Thus, a module can be implemented in hardware, firmware, and/or software. In one embodiment, program modules are stored on a storage device, loaded into memory, and executed by a processor.

Embodiments of the physical components described herein can include other and/or different modules than the ones described here. In addition, the functionality attributed to the modules can be performed by other or different modules in other embodiments. Moreover, this description occasionally omits the term "module" for purposes of clarity and convenience.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope of the invention.

What is claimed is:

1. A method of automatically creating a hierarchical storyline, the method comprising:
    receiving a plurality of labelled contextual slices derived from contextual data of a user, each labelled contextual slice comprising a time range, a location, and a contextual label indicating a semantic description of the labelled contextual slice, wherein receiving the plurality of labelled contextual slices comprises:
        receiving a plurality of contextual slices derived from associated context data collected from a plurality of observation sources, each contextual slice is bound by the time range at the location; and
        for each of the plurality of contextual slices:
            identifying a set of candidate labels based on context data associated with the contextual slice, the candidate labels each comprising semantic data describing context data associated with the contextual slice, the semantic data selected from a group consisting of venue geography boundary, venue name, venue type, and venue activity name, venue activity location, venue activity popularity and calendar event;

ranking the set of candidate labels by likelihood based on a proximity threshold to the venue geography boundary and ordered by the venue activity popularity, the proximity threshold from the centroid location of the venue geography boundary; and applying one or more of the candidate labels to the contextual slice to make one of the plurality of labelled contextual slices;

retrieving, from a storage, a contextual pattern specifying a sequence of contextual labels, wherein the sequence includes a plurality of contextual labels with semantic descriptions that when aggregated correspond to a common semantic description;

searching the received labelled contextual slices for a temporally contiguous group of contextual slices having the sequence of contextual labels specified by the pattern;

identifying, by a processor, the temporally contiguous group of contextual slices as a matching group responsive to the temporally contiguous group of contextual slices having the sequence of contextual labels specified by the pattern and rank;

ordering the matching group of labelled contextual slices by rank;

grouping the matching group of labelled contextual slices having at least a minimum threshold rank based on visit year; and applying the common semantic description to the ranked matching group of labelled contextual slices as the user's storyline.

2. The method of claim 1, further comprising:
retrieving, from the storage, an additional contextual pattern specifying an additional sequence of contextual labels;
searching the received labelled contextual slices for an additional temporally contiguous group of contextual slices having the sequence of contextual labels specified by the pattern;
identifying the additional temporally contiguous group of contextual slices as an additional matching group responsive to the additional temporally contiguous group of contextual slices having the additional sequence of contextual labels specified by the additional contextual pattern;
determining whether the additional matching group of labelled contextual slices comprises at least a threshold number of contextual slices in common with the matching group of labelled contextual slices; and
determining whether to merge the matching group and the additional matching group responsive to determining that the additional matching group comprises at least the threshold number of contextual slices in common with the matching group.

3. The method of claim 2, wherein determining whether to merge the matching group and the additional matching group comprises:
determining to merge the matching group and the additional matching group of labelled contextual slices responsive to determining that the additional matching group encompasses a shorter time duration than the matching group and responsive to determining that the matching group and the additional matching group are associated with group labels containing at least one matching non-temporal context.

4. The method of claim 1, wherein the contextual pattern further specifies a threshold likelihood for each contextual label in the sequence and identifying the temporally contiguous group of contextual slices as a matching group includes determining that a likelihood of a label of each slice in the temporally contiguous group exceeds the corresponding threshold likelihood.

5. The method of claim 1, wherein the retrieved contextual pattern was obtained by:
receiving additional groups of labelled contextual slices identified by the user; and
identifying the contextual pattern from a common temporal sequence of contextual labels identified at least a threshold number of instances among the additional groups of labelled contextual slices.

6. The method of claim 1, wherein associating the matching group with the group label comprises:
obtaining a label template associated with the contextual pattern, the label template specifying one or more contextual categories;
identifying, from contextual labels of the matching group of labelled contextual slices, a contextual label describing at least a threshold proportion of the matching group of labelled contextual slices, the identified contextual label in one of the one or more contextual categories in the label template; and
generating the group label by using the identified contextual label in the pattern template.

7. The method of claim 1, wherein associating the matching group with the group label comprises:
selecting a contextual category specified by at least a threshold number of contextual labels in the sequence of contextual labels;
identifying contextual labels in the selected contextual category, the identified contextual labels describing at least a threshold proportion of contextual slices of the matching group; and
selecting the group label from the identified contextual labels, the selected group label having a highest level of specificity among the identified one or more contextual labels.

8. The method of claim 1, wherein providing the matching group of labelled contextual slices comprises providing a storyline comprising the matching group of labelled contextual slices and an additional group of labelled contextual slices, the matching group and the additional group associated with group labels comprising at least one matching contextual label.

9. The method of claim 8, wherein the storyline is provided in a user interface displaying a visual representation of the matching group of labelled contextual slices, the user interface configured to display visual representations of the identified contextual slices responsive to a user input directed at the visual representation of the matching group.

10. The method of claim 1, wherein providing the matching group of labelled contextual slices comprises:
receiving, from the user, a correction comprising at least one of a corrected group label and a corrected group of labelled contextual slices; and
storing an updated version of at least one of the group label and the group responsive to receiving the correction.

11. The method of claim 1, wherein the receiving comprises:
receiving contextual data of a user;
slicing the contextual data into a plurality of non-overlapping contextual slices corresponding to a common semantic description; and
applying labels to at least some of the contextual slices, such that each contextual slice comprises a time range, a location, and a contextual label indicating a semantic description of the labelled contextual slice.

12. The method of claim 1, wherein the plurality of observation sources are of a plurality of types, the method further comprising:
identifying an observation source of the plurality of observation sources from which the context data used to generate a given slice originated;
identifying a type of the observation source from among the plurality of types; and
determining an uncertainty in a location of the given slice based on the type of the observation source, wherein each candidate label matches the location of the given slice within the predetermined uncertainty.

13. The method of claim 1, wherein the likelihood by which the candidate labels are ranked is a likelihood that the candidate label is correct and applying one or more of the candidate labels comprises applying a first candidate label responsive to the corresponding likelihood exceeding a threshold.

14. A non-transitory computer-readable medium comprising instructions executable by a processor, the instructions for:
receiving a plurality of labelled contextual slices derived from contextual data of a user, each labelled contextual slice comprising a time range, a location, and a contextual label indicating a semantic description of the labelled contextual slice, wherein receiving the plurality of labelled contextual slices comprises:
receiving a plurality of contextual slices derived from associated context data collected from a plurality of observation sources, each contextual slice is bound by the time range at the location; and for each of the plurality of contextual slices:
identifying a set of candidate labels based on context data associated with the contextual slice, the candidate labels each comprising semantic data describing context data associated with the contextual slice, the semantic data selected from a group consisting of venue geography boundary, venue name, venue type, and venue activity name, venue activity location, venue activity popularity and calendar event;
ranking the set of candidate labels by likelihood based on a proximity threshold to the venue geography boundary and ordered by the venue activity popularity, the proximity threshold from the centroid location of the venue geography boundary; and
applying one or more of the candidate labels to the contextual slice to make one of the plurality of labelled contextual slices;
retrieving, from a storage, a contextual pattern specifying a sequence of contextual labels, wherein the sequence includes a plurality of contextual labels with semantic descriptions that when aggregated correspond to a common semantic description;
searching the received labelled contextual slices for a temporally contiguous group of contextual slices having the sequence of contextual labels specified by the pattern;
identifying, by a processor, the temporally contiguous group of contextual slices as a matching group responsive to the temporally contiguous group of contextual slices having the sequence of contextual labels specified by the pattern and rank;
ordering the matching group of labelled contextual slices by rank;
grouping the matching group of labelled contextual slices having at least a minimum threshold rank based on visit year; and
applying the common semantic description to the ranked matching group of labelled contextual slices as the user's storyline.

15. The computer-readable medium of claim 14, further comprising instructions for:
retrieving, from the storage, an additional contextual pattern specifying an additional sequence of contextual labels;
searching the received labelled contextual slices for an additional temporally contiguous group of contextual slices having the sequence of contextual labels specified by the pattern;
identifying the additional temporally contiguous group of contextual slices as an additional matching group responsive to the additional temporally contiguous group of contextual slices having the additional sequence of contextual labels specified by the additional contextual pattern;
determining whether the additional matching group of labelled contextual slices comprises at least a threshold number of contextual slices in common with the matching group of labelled contextual slices; and
determining whether to merge the matching group and the additional matching group responsive to determining that the additional matching group comprises at least the threshold number of contextual slices in common with the matching group.

16. The computer-readable medium of claim 15, wherein instructions for determining whether to merge the group and the additional group comprise instructions for:
determining to merge the matching group and the additional matching group of labelled contextual slices responsive to determining that the additional matching group encompasses a shorter time duration than the matching group and responsive to determining that the matching group and the additional matching group are associated with group labels containing at least one matching non-temporal context.

17. The computer-readable medium of claim 14, wherein the contextual pattern further specifies a threshold likelihood for each contextual label in the sequence and the instructions for identifying the temporally contiguous group of contextual slices as a matching group include instructions for determining that a likelihood of a label of each slice in the temporally contiguous group exceeds the corresponding threshold likelihood.

18. The computer-readable medium of claim 14, wherein the retrieved contextual pattern was obtained by:
receiving additional groups of labelled contextual slices identified by the user; and
identifying the contextual pattern from a common temporal sequence of contextual labels identified at least a threshold number of instances among the additional groups of labelled contextual slices.

19. The computer-readable medium of claim 14, wherein instructions for associating the matching group with the group label comprise instructions for:
    obtaining a label template associated with the contextual pattern, the label template specifying one or more contextual categories;
    identifying, from contextual labels of the matching group of labelled contextual slices, a contextual label describing at least a threshold proportion of the matching group of labelled contextual slices, the identified contextual label in one of the one or more contextual categories in the label template; and
    generating the group label by using the identified contextual label in the pattern template.

20. The computer-readable medium of claim 14, wherein instructions for associating the matching group with the group label comprise instructions for:
    selecting a contextual category specified by at least a threshold number of contextual labels in the sequence of contextual labels;
    identifying contextual labels in the selected contextual category, the identified contextual labels describing at least a threshold proportion of contextual slices of the matching group; and
    selecting the group label from the identified contextual labels, the selected group label having a highest level of specificity among the identified one or more contextual labels.

21. The computer-readable medium of claim 14, wherein instructions for providing the matching group of labelled contextual slices comprise instructions for providing a storyline comprising the matching group of labelled contextual slices and an additional group of labelled contextual slices, the matching group and the additional group associate with group labels comprising at least one matching contextual label.

22. The computer-readable medium of claim 21, wherein the storyline is provided in a user interface displaying a visual representation of the matching group of labelled contextual slices, the user interface configured to display visual representations of the identified contextual slices responsive to a user input directed at the visual representation of the matching group.

23. A system for organizing contextual data, the system comprising:
    a processor; and
    a non-transitory computer-readable medium comprising instructions executable by the processor, the instructions for:
        receiving a plurality of labelled contextual slices derived from contextual data of a user, each labelled contextual slice comprising a time range, a location, and a contextual label indicating a semantic description of the labelled contextual slice, wherein receiving the plurality of labelled contextual slices comprises:
            receiving a plurality of contextual slices derived from associated context data collected from a plurality of observation sources, each contextual slice is bound by the time range at the location; and for each of the plurality of contextual slices:
            identifying a set of candidate labels based on context data associated with the contextual slice, the candidate labels each comprising semantic data describing context data associated with the contextual slice, the semantic data selected from a group consisting of venue geography boundary, venue name, venue type, and venue activity name, venue activity location, venue activity popularity and calendar event;
            ranking the set of candidate labels by likelihood based on a proximity threshold to the venue geography boundary and ordered by the venue activity popularity, the proximity threshold from the centroid location of the venue geography boundary; and
            applying one or more of the candidate labels to the contextual slice to make one of the plurality of labelled contextual slices;
        retrieving, from a storage, a contextual pattern specifying a sequence of contextual labels, wherein the sequence includes a plurality of contextual labels with semantic descriptions that when aggregated correspond to a common semantic description;
        searching the received labelled contextual slices for a temporally contiguous group of contextual slices having the sequence of contextual labels specified by the pattern;
        identifying, by a processor, the temporally contiguous group of contextual slices as a matching group responsive to the temporally contiguous group of contextual slices having the sequence of contextual labels specified by the pattern;
        ordering the matching group of labelled contextual slices by rank;
        grouping the matching group of labelled contextual slices having at least a minimum threshold rank based on visit year; and
        applying the common semantic description to the ranked matching group of labelled contextual slices as the user's storyline.

* * * * *